(12) United States Patent
Lefebvre et al.

(10) Patent No.: US 12,617,541 B1
(45) Date of Patent: May 5, 2026

(54) EXHAUST CASE FOR AIRCRAFT ENGINE

(71) Applicant: PRATT & WHITNEY CANADA CORP., Longueuil (CA)

(72) Inventors: Guy Lefebvre, St-Bruno-de-Montarville (CA); Francois Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 14 days.

(21) Appl. No.: 18/987,246

(22) Filed: Dec. 19, 2024

(51) Int. Cl.
 B64D 33/04 (2006.01)
 F01D 25/30 (2006.01)

(52) U.S. Cl.
 CPC ............. B64D 33/04 (2013.01); F01D 25/30 (2013.01)

(58) Field of Classification Search
 None
 See application file for complete search history.

(56) References Cited

U.S. PATENT DOCUMENTS

| | | | |
|---|---|---|---|
| 3,152,443 | A | 10/1964 | Newland |
| 3,388,550 | A * | 6/1968 | Binek ..................... F01D 25/30 60/39.5 |
| 4,040,249 | A | 8/1977 | Kahle et al. |
| 4,177,638 | A | 12/1979 | Wood |
| 4,765,751 | A | 8/1988 | Pannone et al. |
| 6,290,173 | B1 | 9/2001 | Nickels |
| 8,965,728 | B2 | 2/2015 | Snider et al. |
| 9,157,334 | B2 | 10/2015 | Grede et al. |

| | | | |
|---|---|---|---|
| 9,880,059 | B2 | 1/2018 | Myers et al. |
| 9,969,500 | B2 | 5/2018 | Anderson et al. |
| 10,119,449 | B2 | 11/2018 | Boekeloo et al. |
| 10,514,003 | B2 | 12/2019 | Akcayoz et al. |
| 10,550,767 | B2 | 2/2020 | Eleftheriou et al. |
| 10,697,076 | B2 | 6/2020 | Millward et al. |
| 11,319,897 | B2 | 5/2022 | Joo et al. |
| 11,428,122 | B1 | 8/2022 | Lefebvre et al. |
| 11,719,165 | B2 | 8/2023 | Le Pape et al. |
| 11,840,346 | B2 | 12/2023 | Ozóg |
| 11,905,844 | B2 * | 2/2024 | Kim ........................ F01D 25/30 |
| 11,999,501 | B2 | 6/2024 | Joo et al. |

(Continued)

FOREIGN PATENT DOCUMENTS

EP 3299592 B1 3/2020

*Primary Examiner* — Courtney D Heinle
*Assistant Examiner* — Danielle M. Christensen
(74) *Attorney, Agent, or Firm* — NORTON ROSE FULBRIGHT CANADA LLP

(57) ABSTRACT

An exhaust system, has: a turbine exhaust duct (TED) having an annular inlet conduit extending around a central axis, and outlet conduits fluidly communicating with the annular inlet conduit and extending generally radially outward relative to the annular inlet conduit; and an exhaust case surrounding the TED, the exhaust case having openings, each of the outlet conduits received through a respective one of the openings; and exhaust conduits secured to the exhaust case and each extending around a respective one of the openings of the exhaust case, an exhaust conduit of the exhaust conduits including: a duct protruding away from the exhaust case and fluidly communicating with a respective one of the outlet conduits; a flange flaring away from the duct, the exhaust conduit secured to the exhaust case via the flange; and a stiffener protruding transversally from the flange, the flange located between the duct and the stiffener.

19 Claims, 6 Drawing Sheets

(56)        References Cited

U.S. PATENT DOCUMENTS

| 12,246,844 | B1 | 3/2025 | Weaver et al. |
| 2014/0366544 | A1 | 12/2014 | Maccaul et al. |
| 2024/0150030 | A1 | 5/2024 | Legras et al. |
| 2024/0254942 | A1 | 8/2024 | Akcayoz et al. |

* cited by examiner

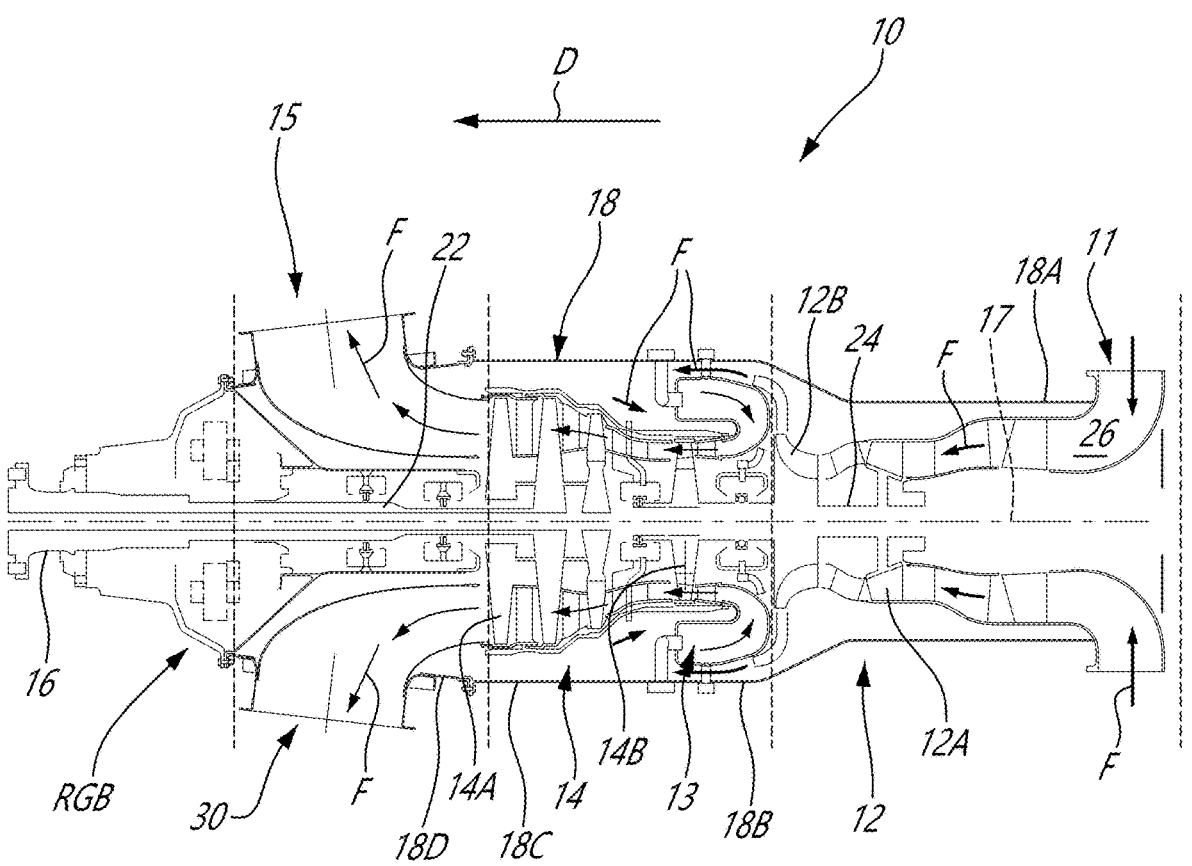
_FIG. 1_

_FIG_.3

EXHAUST CASE FOR AIRCRAFT ENGINE

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory to some extend, but improvements are always sought.

SUMMARY

In one aspect, there is provided an exhaust system for an aircraft engine, comprising: a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; and an exhaust case surrounding the TED, the exhaust case having openings, each of the outlet conduits received through a respective one of the openings; and exhaust conduits secured to the exhaust case and each extending around a respective one of the openings of the exhaust case, an exhaust conduit of the exhaust conduits including: a duct protruding away from the exhaust case and fluidly communicating with a respective one of the outlet conduits; a flange flaring away from the duct, the exhaust conduit secured to the exhaust case via the flange; and a stiffener protruding transversally from the flange, the flange located between the duct and the stiffener.

The exhaust system described above may include any of the following features, in any combinations.

In some embodiments, the stiffener defines an angle with the flange, the angle being at least about 90 degrees.

In some embodiments, the stiffener has a height taken along a conduit axis of the exhaust conduit, the height being less than that of the duct.

In some embodiments, the stiffener extends around the duct from a first end to a second end, a gap defined between the first end and the second end, the gap being free of the stiffener.

In some embodiments, the gap is aligned with a closest location between the flange and a mounting flange of the exhaust case.

In some embodiments, a weld or braze joint is located between the flange and the exhaust case.

In some embodiments, the weld or braze joint extends a full periphery of the respective one of the openings.

In some embodiments, a thickness of the stiffener is greater than a thickness of the duct.

In some embodiments, the stiffener, the duct, and the flange are parts of a single monolithic body of the exhaust conduit.

In some embodiments, a portion of a respective one of the outlet conduits extends inside the duct.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; and a turbine exhaust duct (TED) having an annular inlet conduit extending around the central axis for directing combustion gases generally in an axial direction and outlet conduits communicating with the annular inlet conduit and extending generally radially outward relative to the annular inlet conduit; and exhaust conduits secured to the exhaust case and each extending around a respective one of the openings of the exhaust case, the exhaust conduits secured to the exhaust case via flanges thereof, the exhaust conduits further including stiffening lips extending transversally to the exhaust case and extending at least partially around the openings.

The reverse-flow gas turbine engine described above may include any of the following features, in any combinations.

In some embodiments, the stiffening lips define an angle with the flange, the angle being at least 90 degrees.

In some embodiments, the stiffening lips have a height taken along a conduit axis of the exhaust conduit, the height being less an overall height of the exhaust conduit.

In some embodiments, the stiffening lips extend around the openings from first ends to second ends, gaps defined between the first ends and the second ends, the gaps being free of the stiffening lips.

In some embodiments, the gaps are aligned with closest locations between the flanges and a mounting flange of the exhaust case.

In some embodiments, weld or braze joints are located between the flanges and the exhaust case.

In some embodiments, the weld or braze joints extend full peripheries of the openings.

In some embodiments, a thickness of the stiffening lips is greater than a thickness of a duct of the exhaust conduit.

In some embodiments, the exhaust conduits include ducts, the flanges, and the stiffening lips, the ducts, the flanges and the stiffener being parts of monolithic arts of the exhaust conduits.

In some embodiments, portions of the outlet conduits extend inside the exhaust conduits.

DESCRIPTION OF THE DRAWINGS

Reference is now made to the accompanying figures in which:

FIG. 1 is a schematic cross-sectional view of an aircraft engine depicted as a turboprop gas turbine engine;

DETAILED DESCRIPTION

Figure 2:
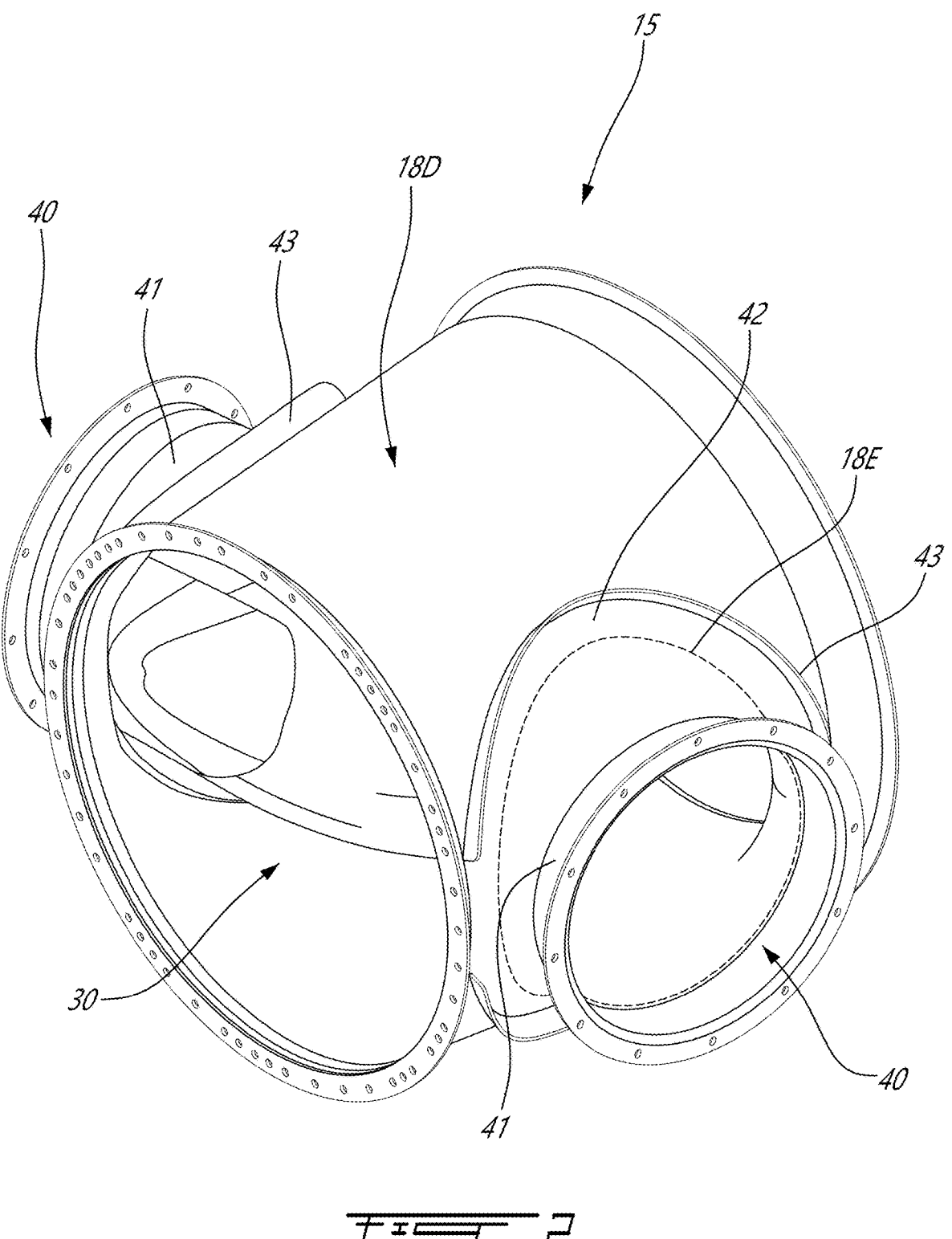
FIG. 2 is a three dimensional view of an exhaust system of the aircraft engine of FIG. 1.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a central core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a gearbox RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 3:
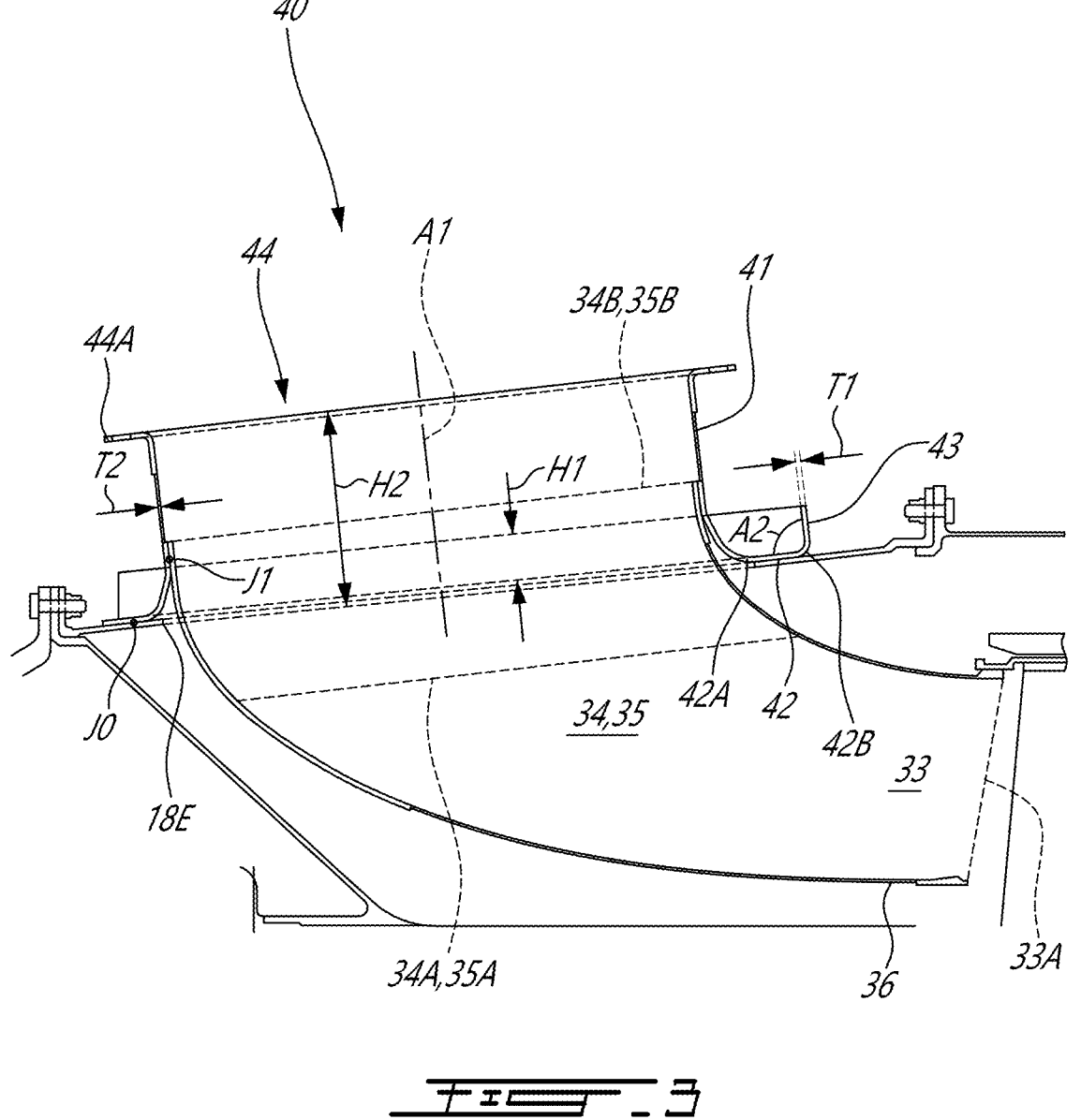
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
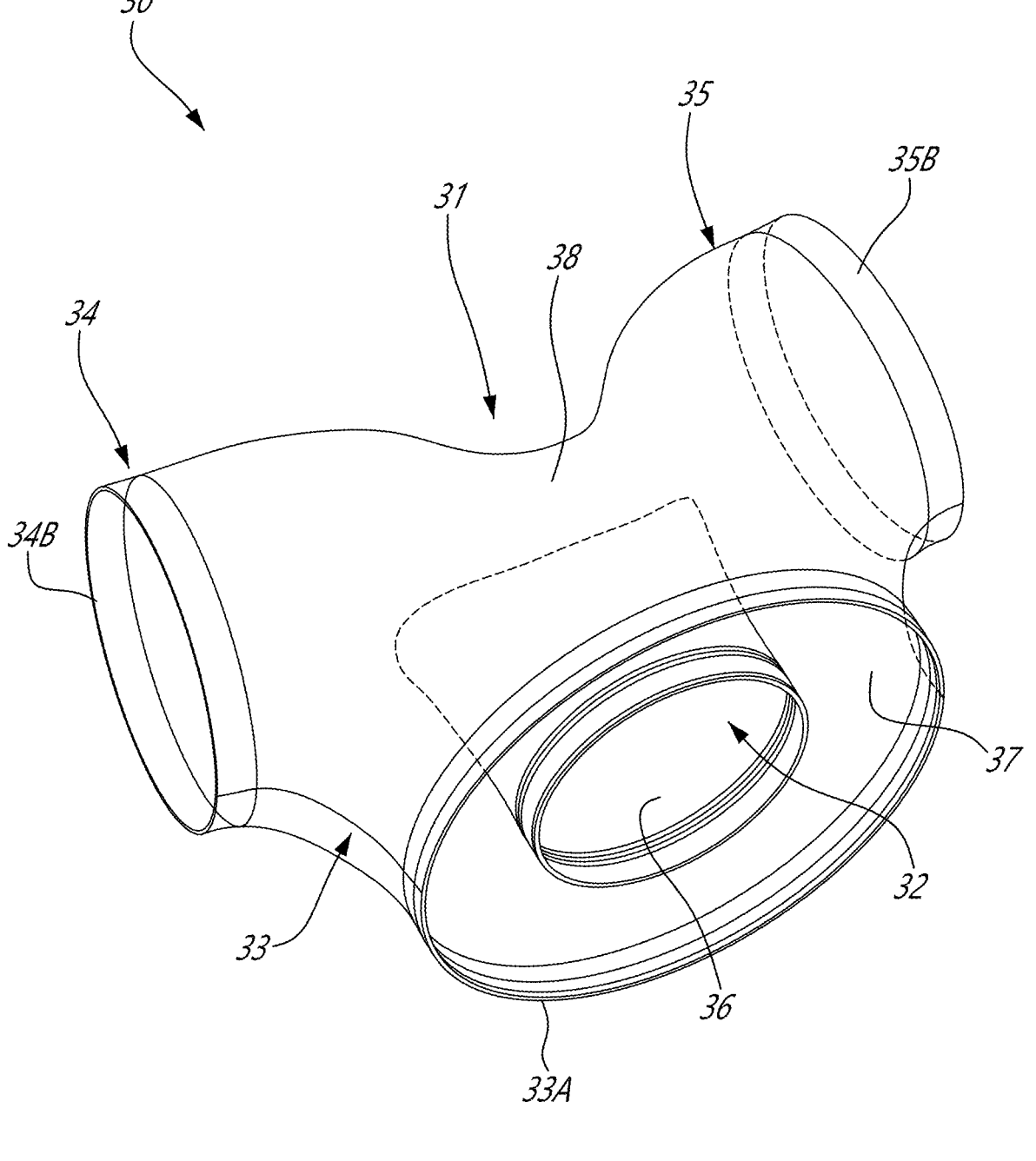
FIG. 4 is a three dimensional view of a turbine exhaust duct of the exhaust system of FIG. 3.
Figure 5:
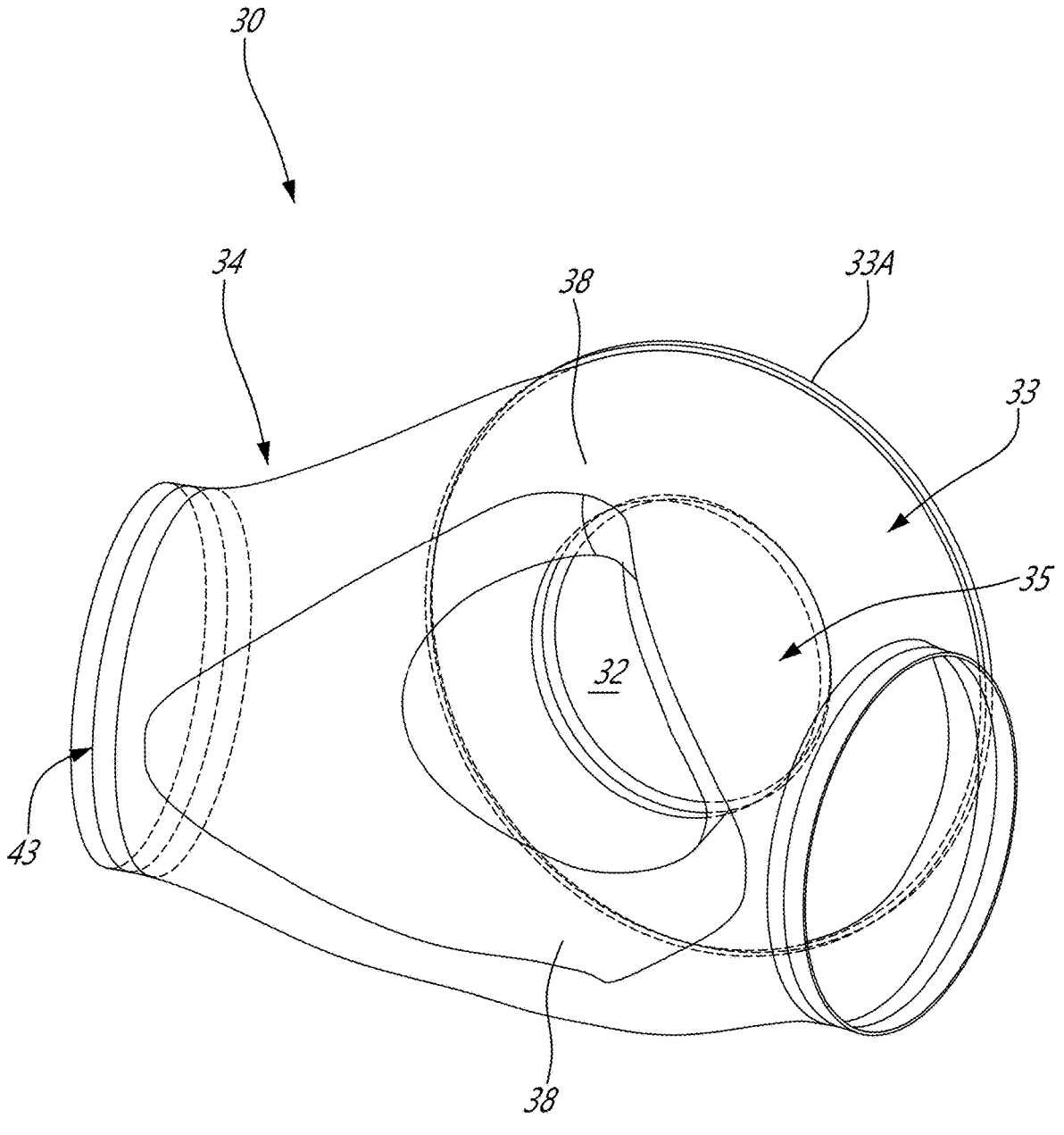
FIG. 5 is another three dimensional view of the turbine exhaust duct of FIG. 4.

Referring now to FIGS. 4-5, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e. the exhaust flow discharged from the exhaust duct is not axial, it is rather directed in a direction that diverges from the central axis 17). According to at least some embodiments, the TED 30 has a generally "Y-shaped" body including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit portion 34, 35 projects outwardly of the exhaust case 18D. As best shown in FIG. 3, each outlet conduit portion 34, 35 terminates into an exhaust port. The outlet conduits extend along respective axes that intersect the central axis 17. According to the illustrated embodiment, these axes has a main radial component and a secondary (i.e. smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g. oval).

Referring to FIGS. 3-5, the turbine exhaust duct 30, in this embodiment is a dual ports exhaust duct, and is formed by a generally Y-shaped body 31. The body 31 defines a fluid flow passage(s) about a central bore 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired the body 31 may include more than two outlet conduits. The inlet conduit 33 may be provided in the form of an annular inlet conduit 33 wherein the inlet conduit 33 is connected to and communicates with the outlet conduits 34, 35. The outlet conduits 34, 35 may not be perpendicularly positioned relative to the inlet conduit 33 (i.e. be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIG. 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Still referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations.

As shown in FIGS. 4-5, the outer peripheral wall 37 and the inner peripheral wall 36 are connected to one another at outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

The inventors of the present disclosure discovered that, during engine operation, loads are transferred from the RGB to the exhaust system 15. The rigidity of the exhaust system 15 may thus be sufficiently high to support the loads transferred thereto. As discussed above, the exhaust case 18D of the exhaust system 15 defines openings 18E, which may impair its rigidity. The challenge therefore lies in increasing the rigidity of the exhaust case 18D while minimizing weight penalties.

As will be seen hereinafter, according to at least some embodiments, the exhaust case 18D may be easily tunable to increase or reduce the stiffness by changing the sheet metal thickness. According to some aspects, the exhaust case design includes a stiffener to increase the rigidity while minimizing weight increase. To do so, the stiffener may be formed with a reverse shape (herein referred to as a wedge stiffener) on the contour of a seam weld location. This stiffener profile may make the contour of the openings 18E stiffer and may reduce the distortion around these openings 18E when a load is applied to a mounting flange 18F of the exhaust case 18D to which the RGB is secured.

Referring back to FIGS. 2-3, the exhaust system 15 further includes exhaust conduits 40, two in the depicted embodiment, one for each of the outlet conduits 34, 35 of the turbine exhaust duct 30, secured to the exhaust case 18D and each extending around a respective one of the openings 18E of the exhaust case 18D. The exhaust conduits 40 each includes a duct 41 protruding away from the exhaust case 18D and communicating with a respective one of the outlet conduits 34, 35. The exhaust conduits 40 also includes a flange 42 flaring away from the duct 41. In this embodiment, the exhaust conduits 40 are secured to the exhaust case 18D via the flanges 42. To this end, a first weld (or braze) joint J0 may be located between the flange 42 and the exhaust case 18D. The first weld joint J0 may extend a full periphery of the opening 18E. Other fastening means are contemplated (e.g., fasteners). To increase a stiffness of the exhaust system 15, the exhaust conduit 40 each include a stiffener 43 protruding transversally from the flange 42. The flange 42 may thus be said to be located between the duct 41 and the stiffener 43. The flange 42 is radially between the duct 41 and the stiffener 43 relative to a conduit axis A1 (FIG. 3) of the exhaust conduit 40. The stiffener 43 may be referred to as stiffening lips.

As shown in FIG. 3, the flange 42 extends from a radially-inner end 42A to a radially-outer end 42B relative to the conduit axis A1. The flange 42 defines a contact surface with an outer face of the exhaust case 18D. The flange 42 may therefore extend a full periphery of the opening 18E and curves to follow a frustoconical shape of the exhaust case 18D. The duct 41 protrudes transversally from the radially-inner end 42A of the flange 42 whereas the stiffener 43 protrudes transversely from the radially-outer end 42B of the flange 42. Both of the duct 41 and the stiffener 43 extend away from the exhaust case 18D in a generally radially outward direction relative to the central axis 17 of the gas turbine engine 10. In the embodiment shown, the duct 41, the flange 42, and the stiffener 43 are parts of a single monolithic body of the exhaust conduit 40. They may be otherwise assembled from separated parts using any suitable process such as welding, brazing, or mechanical fastening. As shown in FIG. 3, an exhaust ring 44 is secured to an end of the duct 41. The exhaust ring 44 may define flange 44A for securement to, for instance, a nacelle or other parts of the gas turbine engine 10.

In the embodiment shown, a portion of the outlet conduit 34, 35 of the turbine exhaust duct 30 extends inside the ducts 41 of the exhaust conduit 40. In other words, an overlap is defined between the ducts 41 of the exhaust conduits 40 and the outlet conduits 34, 35 of the turbine exhaust duct 30. The ducts 41 may be secured to the outlet conduits 34, 35 at the overlap therebetween using, for instance, a second weld (or braze) joint J1.

In the embodiment shown, an angle A2 between the stiffener 43 and the flange 42 is at least 90 degrees. The angle A2 may be decreased or increased to meet stiffness requirements. The stiffener 43 may have a height H1 taken along the conduit axis A1 of the exhaust conduit 40 being less than an overall height H2 of the exhaust conduit 40. The overall height H2 may correspond to a height of the duct 41. In some embodiments, a thickness T1 of the stiffener 43 is greater than a thickness T2 of the duct 41. The thickness T1 of the stiffener 43 may be tuned based on rigidity requirements.

The height H1 of the stiffener 43 corresponds to at least a radial span of the flange 42 taken from its radially-inner end to its radially-outer end and relative to central axes of the outlet conduits 34, 35. The thickness T1 may range from the thickness of the exhaust case 18D to about 2.5 to 3 times the thickness of the exhaust case 18D.

Figure 6:
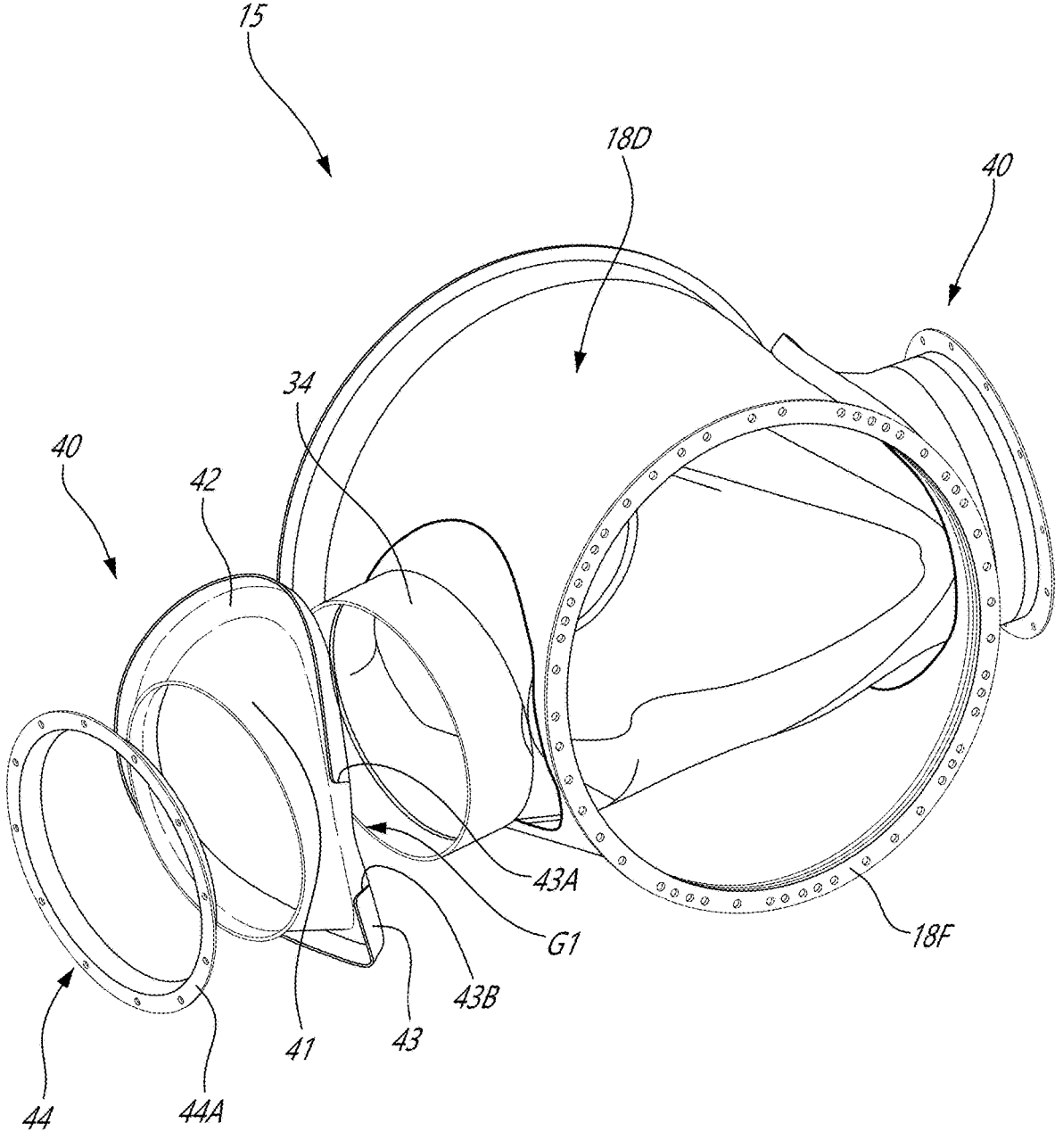
FIG. 6 is a three dimensional exploded view of the exhaust system of FIG. 3 illustrating an assembly sequence thereof.

Referring more particularly to FIG. 6, in this embodiment, the stiffener 43 extends around the duct 41 from a first end 43A to a second end 43B. A gap G1 is defined between the first end 43A and the second end 43B. The gap G1 is free of the stiffener 43. This gap G1 is aligned with a closest location between the flange 42 of the exhaust conduit 40 and the mounting flange 18F of the exhaust case 18D. The mounting flange 18F is located at a forward end of the exhaust case 18D. Put differently, the interruption or gap G1 in the stiffener 43 is designed to accommodate the mounding flange 18F of the exhaust case 18D. In some other embodiments, the stiffener 43 may extend a full periphery around the duct 41.

The disclosed stiffener 43 may increase an overlap stiffness of the exhaust system 15 while minimizing weight increase to allow the exhaust system 15 to withstand the loads and hot combustion gases it is subjected to.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

In the context of the present disclosure, the expression "about" implies variations of plus or minus 10%.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An exhaust system for an aircraft engine, comprising:
a turbine exhaust duct (TED) having an annular inlet conduit extending around a central axis for directing combustion gases generally in an axial direction, and outlet conduits fluidly communicating with the annular inlet conduit and extending generally radially outward relative to the annular inlet conduit; and
an exhaust case surrounding the TED, the exhaust case having openings, each of the outlet conduits received through a respective one of the openings; and
exhaust conduits secured to the exhaust case and each extending around a respective one of the openings of the exhaust case, an exhaust conduit of the exhaust conduits including:
a duct protruding away from the exhaust case and fluidly communicating with a respective one of the outlet conduits;
a flange flaring away from the duct, the exhaust conduit secured to the exhaust case via the flange; and
a stiffener protruding transversally from the flange, the flange located between the duct and the stiffener.

2. The exhaust system of claim 1, wherein the stiffener defines an angle with the flange, the angle being at least about 90 degrees.

3. The exhaust system of claim 1, wherein the stiffener has a height taken along a conduit axis of the exhaust conduit, the height being less than that of the duct.

4. The exhaust system of claim 1, wherein the stiffener extends around the duct from a first end to a second end, a gap defined between the first end and the second end, the gap being free of the stiffener.

5. The exhaust system of claim 4, wherein the gap is aligned with a closest location between the flange and a mounting flange of the exhaust case.

6. The exhaust system of claim 1, wherein a weld or braze joint is located between the flange and the exhaust case.

7. The exhaust system of claim 6, wherein the weld or braze joint extends a full periphery of the respective one of the openings.

8. The exhaust system of claim 1, wherein a thickness of the stiffener is greater than a thickness of the duct.

9. The exhaust system of claim 1, wherein the stiffener, the duct, and the flange are parts of a single monolithic body of the exhaust conduit.

10. A reverse-flow gas turbine engine, comprising:

an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; and a turbine exhaust duct (TED) having an annular inlet conduit extending around the central axis for directing combustion gases generally in an axial direction and outlet conduits communicating with the annular inlet conduit and extending generally radially outward relative to the annular inlet conduit; and exhaust conduits secured to the exhaust case and each extending around a respective one of the openings of the exhaust case, the exhaust conduits secured to the exhaust case via flanges thereof, the exhaust conduits further including stiffening lips extending transversally to the exhaust case and extending at least partially around the openings.

11. The reverse-flow gas turbine engine of claim 10, wherein each of the stiffening lips defines an angle with a respective one of the flanges, the angle being at least 90 degrees.

12. The reverse-flow gas turbine engine of claim 10, wherein each of the stiffening lips has a height taken along a conduit axis a respective one of the exhaust conduits, the height being less an overall height of the respective one of exhaust conduits.

13. The reverse-flow gas turbine engine of claim 10, wherein the stiffening lips extend around the openings from first ends to second ends, gaps defined between the first ends and the second ends, the gaps being free of the stiffening lips.

14. The reverse-flow gas turbine engine of claim 13, wherein the gaps are aligned with closest locations between the flanges and a mounting flange of the exhaust case.

15. The reverse-flow gas turbine engine of claim 10, wherein weld or braze joints are located between the flanges and the exhaust case.

16. The reverse-flow gas turbine engine of claim 15, wherein the weld or braze joints extend full peripheries of the openings.

17. The reverse-flow gas turbine engine of claim 10, wherein a thickness of the stiffening lips is greater than a thickness of a duct of the exhaust conduit.

18. The reverse-flow gas turbine engine of claim 10, wherein the exhaust conduits include ducts, the flanges, and the stiffening lips, the ducts, the flanges and the stiffener being parts of monolithic arts of the exhaust conduits.

19. The reverse-flow gas turbine engine of claim 10, wherein portions of the outlet conduits extend inside the exhaust conduits.

* * * * *